Patented Jan. 25, 1938

2,106,465

UNITED STATES PATENT OFFICE 2,106,465

MERCAPTO-THIAZOLE DERIVATIVES

Ludwig Orthner, Frankfort-on-the-Main, and Ewald Zaucker, Cologne-Mulheim, Germany, assignors to I. G. Farbenindustrie Aktiengesellschaft, Frankfort-on-the-Main, Germany No Drawing. Original application June 23, 1931, Serial No. 546,418. Divided and this application August 7, 1935, Serial No. 35,064. In Germany June 30, 1930

2 Claims. (Cl. 260—44)

The present invention relates to new mercapto arylene thiazole derivatives.

Mercapto arylene thiazoles have already been suggested for accelerating vulcanization. This class of substances possesses, however, the disadvantage of an unfavorable critical temperature, that is to say, the use thereof involves the danger of scorching.

It is applicants' invention to have found new mercapto arylene thiazole derivatives which are characterized by a substantially higher critical temperature when applied in vulcanization process. The new compounds are acetamides in which at the most 2 hydrogen atoms of the methyl group linked to the CO are replaced by the group

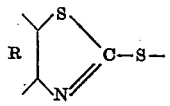

wherein R stands for a benzene or naphthalene radical. As examples for substituents in the said benzene- or naphthalene nuclei there may be mentioned alkyl, alkoxy or nitro groups or halogen atoms.

These new compounds are obtainable by causing an about molecular quantity of a mono- or dihalogen acetamide to react upon about one molecular proportion of a mercaptoarylene thiazole or a salt thereof per each halogen atom. As suitable halogenated acetamides there may be mentioned, for instance, dichloroacet-amide: $CHCl_2.CO.NH_2$; N-dichloro-acet-piperidide:

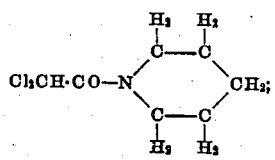

dichloro-acet-anilide: $CHCl_2.CO.NH.C_6H_5$; N-dichloro-acetyl-anthranilic acid ester:

$CHCl_2.CO.NH.C_6H_4.COOC_2H_5$;

dichloroacetyl-dimethylamide:

$CHCl_2.CO.N(CH_3)_2$;

dichloroacetyl-dibutylamide:

$CHCl_2.CO.N(C_4H_9)_2$;

dichloroacetyl-dibenzylamide:

$CHCl_2.CO.N(CH_2.C_6H_5)_2$;

as.dichloroacetyl-phenylhydrazide:

$CHCl_2.CO.NH.NH.C_6H_5$;

as.dichloro-aceto-ortho-nitrophenylhydrazide:

$CHCl_2.CO.NH.NH.C_6H_4.NO_2$;

dichloro-acetylpropylamide: $CHCl_2.CO.NH.C_3H_7$.

The new compounds are generally colorless to yellowish colored crystalline substances, insoluble in water, soluble in the usual organic solvents, and are particularly valuable in view of their favorable critical temperatures, when applied in the vulcanization of rubber or of artificial rubber-like masses.

For vulcanization purposes the new compounds are incorporated within the rubber (which term is intended to include natural rubber as well as artificial rubber-like masses, derived for example, from butadiene, isoprene, dimethylbutadiene or another homologue or an analogue of butadiene) in any desired manner, for example, by rolling or kneading. Obviously, a vulcanizing agent, such as sulfur, agents being capable of splitting off sulfur, selenium etc., is likewise added, and, if desired, other ingredients known to favorably influence rubber vulcanization processes or the properties of the vulcanizates. The rubber mix is then vulcanized in the usual manner by heating it to a temperature sufficient to perform vulcanization, for example, to a temperature between about 100–170° C.

Representatives possessing too low a velocity on hot vulcanization, can be adjusted to give more favorable times of heating by combination with stearic acid and/or with other appropriate accelerators, especially basic accelerators, while preserving a satisfactory critical temperature.

The following examples will illustrate the invention, without, however, restricting it thereto:—

Example 1

100 grams of 1-mercapto benzothiazole are boiled with 24 grams of sodium hydroxide in 200 ccs. of methyl alcohol and 38,4 grams of dichloroacetamide for 5 hours, and then precipitated with water. After recrystallization from propyl alcohol the reaction product obtained has the melting point of 179° C. The reaction probably proceeds according to the equation:—

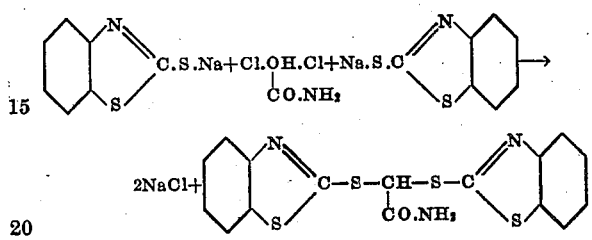

Example 2

In comparison with mercapto benzothiazole (I), the condensation products from mercapto benzothiazole (sodium salt) and dichloroacetamide (II) were tested as accelerators in the following mixture:—

| | Parts by weight |
|---|---|
| Crepe | 100 |
| Zinc oxide | 5 |
| Sulfur | 3 |
| Stearic acid | 1.5 |
| Accelerator | 1 |

The following values were obtained:—

A=tensile strength in kg. per sq. cm.,
B=stretch in percent.

| Heating | | I | | II | |
|---|---|---|---|---|---|
| Pressure ab. atm. | Minutes | A | B | A | B |
| 0.5 | 30 | 59 | 948 | | |
| 3 | 15 | 155 | 832 | 140 | 880 |
| 3 | 35 | 156 | 808 | 174 | 818 |

With a mixture of the composition:—

| | Parts by weight |
|---|---|
| Crepe | 100 |
| Zinc oxide | 5 |
| Sulfur | 3 |
| Stearic acid | 1.5 | and

| | |
|---|---|
| The reaction product from mercapto benzothiazole (sodium salt) with dichloroacetamide | 0.33 | plus

| | |
|---|---|
| Diphenylguanidine (III) | 0.67 | the following figures were obtained:—

| Heating | | III | |
|---|---|---|---|
| Pressure ab. atm. | Minutes | A | B |
| 0.5 | 30 | | |
| 3.0 | 15 | 232 | 820 |
| 3.0 | 35 | 242 | 740 |
| 3.0 | 50 | 235 | 720 |

This is a division of our application for Letters Patent Serial No. 546,418, filed June 23, 1931.

We claim:—

1. As new compounds acetamides in which at the most 2 hydrogen atoms of the methyl group linked to the CO are replaced by the group

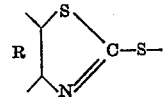

wherein R stands for a benzene or naphthalene radical, these compounds being valuable vulcanization accelerators.

2. The product of the formula

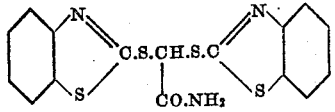

having a melting point of 179° C. and being a valuable vulcanization accelerator.

LUDWIG ORTHNER.
EWALD ZAUCKER.